Figure 1:
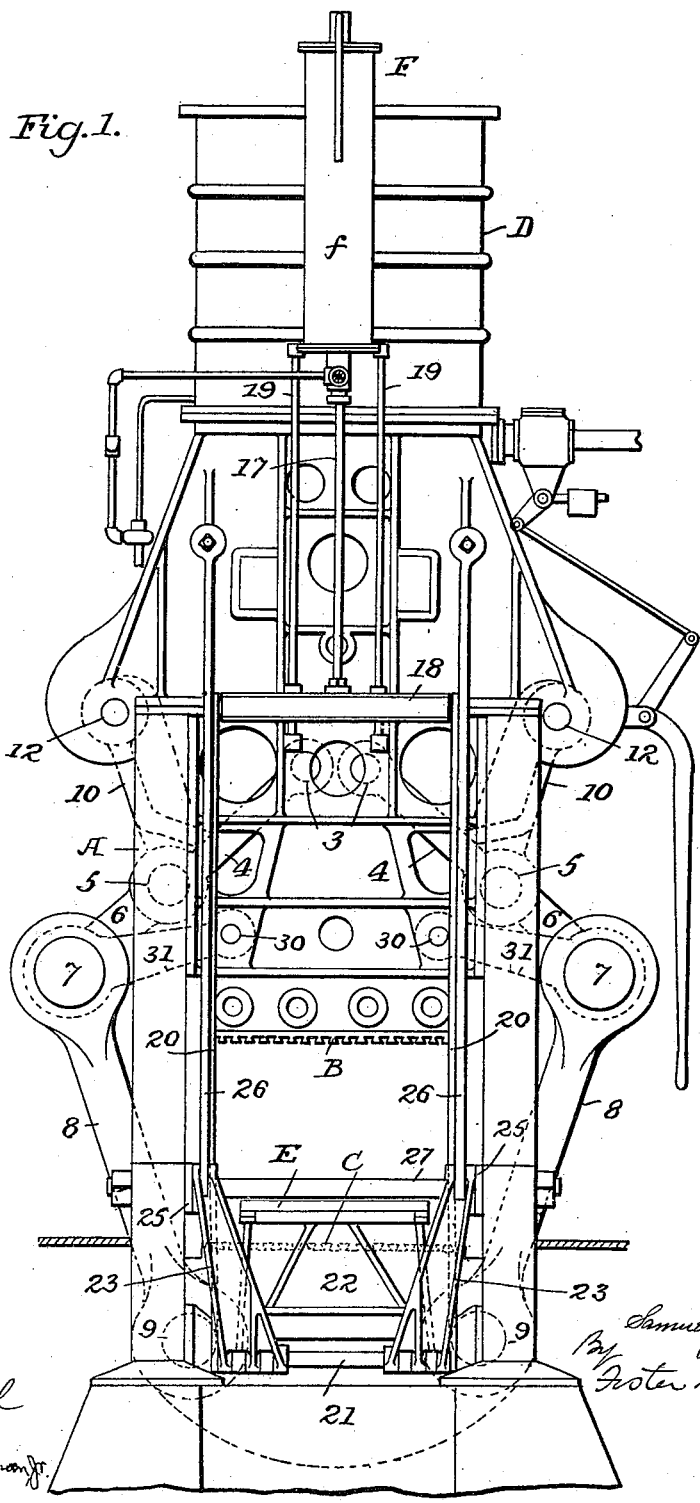

No. 659,612. Patented Oct. 9, 1900.
S. J. WEBB.
METHOD OF COMPRESSING COTTON.
(Application filed June 28, 1900.)

(No Model.) 2 Sheets—Sheet 1.

Witnesses
J. G. Hinkel
H. M. Gellman Jr.

Inventor
Samuel J. Webb
By Foster F. Foreman
Attorneys

No. 659,612. Patented Oct. 9, 1900.
S. J. WEBB.
METHOD OF COMPRESSING COTTON.
(Application filed June 28, 1900.)
(No Model.) 2 Sheets—Sheet 2.
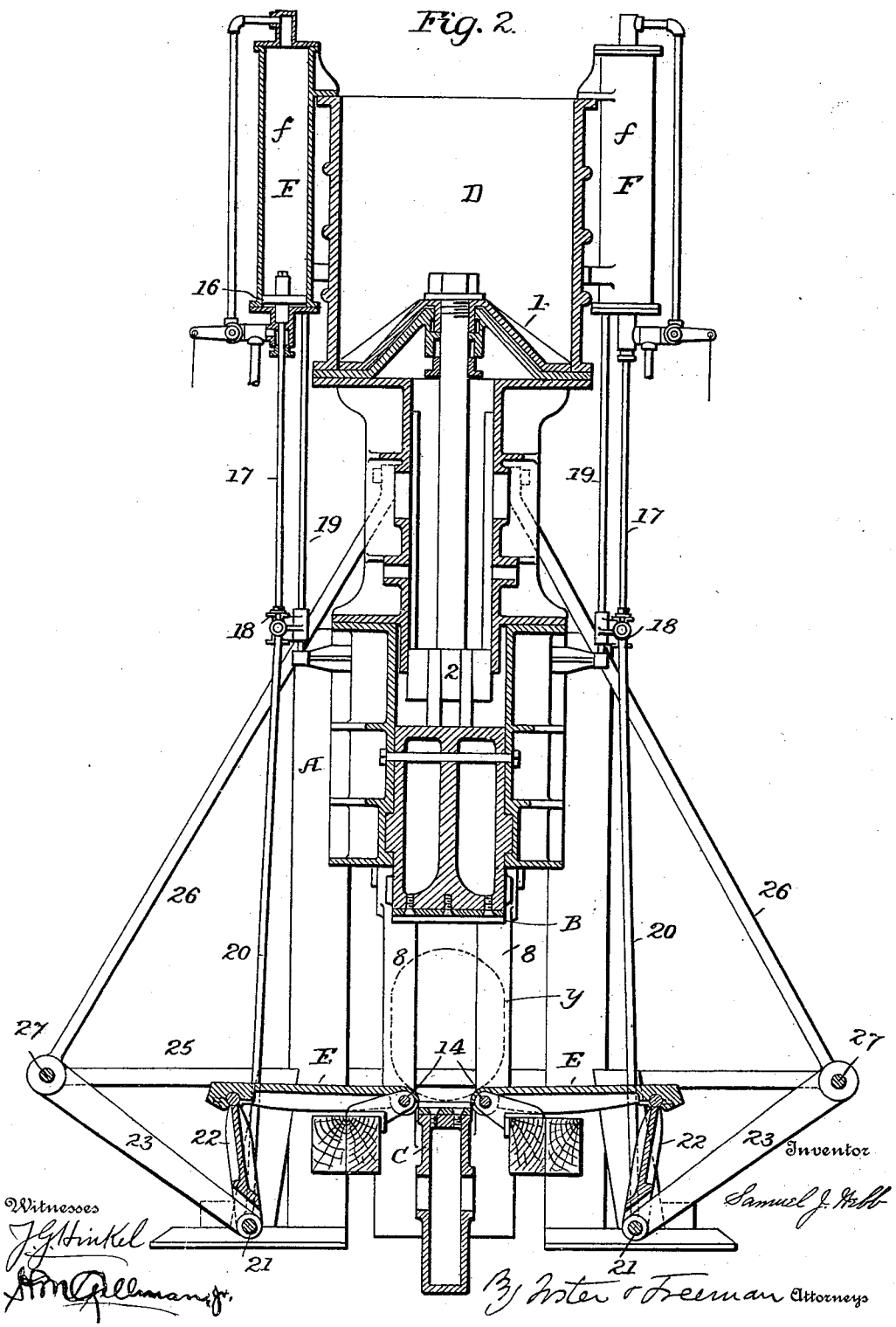

UNITED STATES PATENT OFFICE.

SAMUEL J. WEBB, OF MINDEN, LOUISIANA.

METHOD OF COMPRESSING COTTON.

SPECIFICATION forming part of Letters Patent No. 659,612, dated October 9, 1900.

Application filed June 28, 1900. Serial No. 21,964. (No model.)

*To all whom it may concern:*

Be it known that I, SAMUEL J. WEBB, a citizen of the United States, residing at Minden, in the parish of Webster and State of Louisiana, have invented certain new and useful Improvements in Methods of Compressing Cotton, of which the following is a specification.

My invention relates to an improved method of compressing an ordinary country or plantation bale with a view to increasing its density and decreasing its size; and to this end it consists in the mode of operation substantially as hereinafter more particularly set forth.

It is well known that with a compress exerting a total pressing power of, say, two thousand tons it will exert a certain pressure per square inch upon the bale, according to the area of the surface of the bale to which the pressure is applied. The principal object of my present invention is to provide a new method of operation whereby a bale of cotton can be compressed and its bulk reduced to the greatest possible extent by the use of a press of a given power. In order to accomplish this, I first change the form of an ordinary country or plantation bale, so as to reduce the area of the surface to which the pressure is applied to compress the bale, and I do this without compressing the bale or increasing its density, but by narrowing the bale, so that the area of the surface to which the pressure is applied will be reduced. This narrowed bale is then compressed by applying pressure to this reduced surface.

Thus to more clearly illustrate my improved method when used in connection with an ordinary country or plantation bale we will assume that this bale as it comes to the compress is practically twenty-eight inches wide, forty inches high, and fifty-six inches long and its cubical contents 36.29 cubic feet, and if the bale contains five hundred pounds of cotton its density is 13.7+ pounds per cubic foot. In the first step of my method I change the form of this bale without compressing it or increasing its density or decreasing its bulk to any material extent. Thus in any suitable way I apply pressure to the bale to change its form, so that it will have practically the following dimensions—that is, it will be eighteen inches wide, sixty-six inches high, and about fifty-eight inches long, and its cubical contents will be 39.87+ cubic feet and its density will be 12.5+ pounds per cubic feet. The bale having the dimensions assumed as it came to the press will have a surface area on the side to which the pressure is to be applied of fifteen hundred and sixty-eight square inches; but after its form has been changed and it has been narrowed from a width of twenty-eight inches to a width of eighteen inches the area of the surface to which the pressure is applied will be about ten hundred and forty-four square inches. Now supposing the narrowed bale is submitted to the compressing action of a press the total pressing power of the platen of which is two thousand tons, it will exert a pressure of 1.91+ tons (three thousand eight hundred and thirty-one plus pounds) per square inch upon the bale instead of a pressure of 1.28 tons (two thousand five hundred and fifty-one plus pounds) per square inch if the bale as brought to the press was subjected thereto before its form was changed or it was narrowed, as above specified. This would amount to an increase of twelve hundred and eighty pounds pressure per square inch on the entire surface of the bale to which the pressure is applied, being a little more than fifty per cent. increase of pressure per square inch if the original plantation-bale were subjected to the same total pressure. It is manifest that this will produce a compressed bale having about fifty per cent. greater density than if the bale in its original form had been subjected to the same total pressing power of the press in the usual way. It will thus be seen that by my method of changing the form and reducing the area of the surface of the bale to which the power is applied and then subjecting it to pressure with a press of a given power a very much greater density can be given to the bale by the single compressing act.

Of course the principle of my invention is the same, regardless of the exact size and dimensions of the plantation-bale to which it is applied, the dimensions above given being illustrative only to show the advantages of my method and the improved results attained by carrying it out, and it is further evident that I am not limited to the particular dimensions of eighteen inches wide and sixty-six inches high in forming the bale to carry out my method.

In carrying out my invention the apparatus may be made in different forms. I will now describe one which has proved to be effective, reference being had to the accompanying drawings, in which—

Figure 1 is a side elevation of a press embodying my improvements, and Fig. 2 a sectional elevation of the same.

The frame A of the press is constructed in any suitable manner to support the upper platen B, which is preferably the fixed platen, although the lower platen C may be fixed, or both may be movable. The movable platen is operated from a steam-cylinder D, the piston 1 of which is provided with a cross-head 2, carrying two pins 3 3, to each of which is connected a link 4, pivoted by a pin 5 to a link 6, which latter is connected by a pin 7 to the upper end of the connecting-rod 8, pivoted at 9 to the lower platen. The pin 5 is carried by a link 10, which is pivoted at 12 to the frame of the press. Links 31 are pivoted at 30 to the frame and to the pins 7. There are two pivoted plates E E, with their pivots 14 opposite the edges of the lower platen-plate, so that when the two plates E E are turned down to a horizontal position the plantation-bale may extend over the hinges of the same, as shown in dotted lines y. When the platens are at their maximum distance apart, the distance between them is considerably greater than the height of the bale, say twelve inches, more or less, so that when the plates E E are turned from a horizontal to a vertical position the particles of cotton in the plantation-bale will be so displaced as to alter the form of the bale without compressing it and practically without condensing it, so that it is reduced in lateral dimensions to a thickness corresponding to the width of the lower platen-plate, say eighteen inches but the surplus cotton is displaced toward the top, so that the height of the bale is increased between the platens, say to sixty-six inches, there being no substantial increase in the density of the bale. It will therefore be noted that the plates E E are not platens or compressing-plates, but are simply displacing-plates, which displace the particles of cotton without materially compressing or condensing the same. When these plates are turned up to the vertical position, they are retained in that position while the cotton is compressed between the platens. The lower platen is brought toward the upper platen to the greatest possible extent, and the bands are then passed through the grooves of the platens (after lowering the plates E) and secured, thus banding the compressed bale, which is therefore reduced to its limited bulk and greatest density by a single pressure in one direction and without any other manipulation.

The displacing-plates while preferably hinged, as they thereby tend to more effectually displace the cotton upward toward the space between the platen and the top of the bale, are not necessarily hinged, but may be moved out and in laterally, especially when the bale is introduced from the end of the press.

While the displacing-plates E E may be operated in any suitable manner, I preferably make use of an engine F for each plate, comprising a cylinder $f$, with a piston 16 and piston-rod 17, connected to a cross-head 18, moving upon suitable guides 19 and connected by connecting-rods 20 to a cross-pin 21, connected by a link 22 to a plate E, the cross-pin being also connected to links 23, each pivoted to the frame at 27, the links being so proportioned that the links 23 22 practically constitute a toggle to secure sufficient power to insure the displacement of the mass of cotton when the plates are brought to a vertical position and also when in line with each other to act as a positive abutment to resist the lateral pressure of the cotton when the mass is being condensed between the platens. To properly support the toggles against this pressure, I make use of tie-rods 25 26, meeting at the pins 27, to which the links 23 are pivoted, the tie-rods 26 extending diagonally upward and being bolted to the frame of the press, while the tie-rods 25 extend across the press between the two pins 27, forming a yoke.

Any suitable arrangement of pipes and valves may be employed for conducting the motor fluid to the cylinders of the engines and discharging the same therefrom.

I do not here claim the apparatus shown and described, which is the subject of a separate application, Serial No. 20,888.

I claim as my invention—

1. The method substantially as hereinbefore described of compressing country or plantation bales, which consists in changing the form of the plantation-bale without compressing it or increasing its density so as to reduce the area of the surface to which pressure is applied to compress the bale, and then compressing the bale by applying pressure to the reduced surface.

2. The method substantially as hereinbefore described of compressing country or plantation bales, which consists in changing the form of the plantation-bale without compressing it or increasing its density so as to reduce the area of the surface to which pressure is applied to compress the bale, then compressing the bale by applying pressure to the reduced surface, and securing the bale in such compressed form.

3. The method substantially as hereinbefore described of compressing country or plantation bales, which consists in changing the form of the plantation-bale without compressing it or increasing its density so as to reduce the area of the surface to which the pressure is applied, and then applying pressure to the reduced surface of the bale, without changing the position of the bale.

4. The method substantially as hereinbefore described of compressing a country or plantation bale, which consists in first changing the form of the bale to make it narrower without compressing it or increasing its density, and then compressing the bale by applying pressure to the narrowed surface of the bale.

5. The method substantially as hereinbefore described of compressing a country or plantation bale, which consists in first changing the form of the bale to make it narrower without compressing or increasing its density, then confining it in such narrowed form, and then compressing the bale by applying pressure to the narrowed surface of the bale.

6. The method substantially as hereinbefore described of compressing a country or plantation bale, which consists in reducing the area of the surface of said bale by changing its form without compressing it, confining it against lateral expansion, and then compressing the bale by applying pressure to the reduced surface.

7. The method substantially as hereinbefore described of compressing a country or plantation bale, which consists in reducing the area of the surface of said bale by changing its form without compressing it, confining it against lateral expansion, then compressing the bale by applying pressure to the reduced surface, and securing the bale in such compressed form.

In testimony whereof I have signed my name to this specification in the presence of two subscribing witnesses.

SAMUEL J. WEBB.

Witnesses:
CHARLES E. FOSTER,
GEORGIA P. KRAMER.